(12) United States Patent
Kawashima et al.

(10) Patent No.: US 9,334,390 B2
(45) Date of Patent: May 10, 2016

(54) RESIN COMPOSITION AND RESIN MOLDED ARTICLE

(71) Applicant: FUJI XEROX CO., LTD., Tokyo (JP)

(72) Inventors: Manabu Kawashima, Kanagawa (JP); Kenji Yao, Kanagawa (JP)

(73) Assignee: FUJI XEROX CO., LTD., Tokyo (JP)

(*) Notice: Subject to any disclaimer, the term of this patent is extended or adjusted under 35 U.S.C. 154(b) by 571 days.

(21) Appl. No.: 13/853,495

(22) Filed: Mar. 29, 2013

(65) Prior Publication Data

US 2014/0076196 A1   Mar. 20, 2014

(30) Foreign Application Priority Data

Sep. 19, 2012  (JP) .................................. 2012-205881

(51) Int. Cl.
*C08K 5/22* (2006.01)
*C08K 5/521* (2006.01)
*C08L 1/02* (2006.01)
*C08L 67/04* (2006.01)
*C08L 1/14* (2006.01)

(52) U.S. Cl.
CPC . *C08K 5/521* (2013.01); *C08L 1/02* (2013.01); *C08L 1/14* (2013.01); *C08L 67/04* (2013.01)

(58) Field of Classification Search
None
See application file for complete search history.

(56) References Cited

U.S. PATENT DOCUMENTS 8,916,631 B2 * 12/2014 Ishiguro .................. B29C 43/24
                                                        524/127
2012/0003459 A1 * 1/2012 Ishiguro .................. B29C 43/24
                                                        524/127

FOREIGN PATENT DOCUMENTS

JP        A-2011-219716        11/2011

OTHER PUBLICATIONS

Ouyang et al, Poly(Lactic Acid) Blended with Cellulolytic Enzyme Lignin: Mechanical and Thermal Properties and Morphology Evaluation, 2011.*

* cited by examiner

*Primary Examiner* — Melvin C Mayes
*Assistant Examiner* — Stefanie Cohen
(74) *Attorney, Agent, or Firm* — Oliff PLC

(57) ABSTRACT

A resin composition includes a polylactic acid resin or cellulose resin, 0.07 phr to 8 phr of lignin, and 4 phr to 30 phr of an aromatic condensed phosphoric acid ester.

16 Claims, No Drawings

RESIN COMPOSITION AND RESIN MOLDED ARTICLE

CROSS-REFERENCE TO RELATED APPLICATIONS

This application is based on and claims priority under 35 USC 119 from Japanese Patent Application No. 2012-205881 filed Sep. 19, 2012.

BACKGROUND

Technical Field

The present invention relates to a resin composition and a resin molded article.

SUMMARY

According to an aspect of the invention, there is provided a resin composition including a polylactic acid resin or cellulose resin, 0.07 phr to 8 phr of lignin, and 4 phr to 30 phr of an aromatic condensed phosphoric acid ester.

DETAILED DESCRIPTION

Hereinbelow, an exemplary embodiment as an example of the present invention will be described in detail.

Resin Composition

The resin composition according to the present exemplary embodiment is a resin composition including a polylactic acid resin or cellulose resin and 0.07 phr to 8 phr of lignin and 4 phr to 30 phr of an aromatic condensed phosphoric acid ester.

Furthermore, the "phr" represents an abbreviation of "per hundred resin". In the case of using a polylactic acid resin or cellulose resin alone as a resin, it represents "parts by weight" with respect to 100 parts by weight of the polylactic acid resin or cellulose resin, whereas in the case of using a polylactic acid resin or cellulose resin in combination with the other resins, it represents "parts by weight" with respect to 100 parts by weight of the total resins.

There is a tendency that a resin molded article formed using a resin composition formed by mixing a polylactic acid resin or cellulose resin with an aromatic condensed phosphoric acid ester which is a phosphorous-containing compound has the aromatic condensed phosphoric acid ester localized in the resin.

On the other hand, it is considered that in the case of adding lignin thereto, a resin molded article having an improved dispersibility of the aromatic condensed phosphoric acid ester is obtained.

The reason why the dispersibility is improved is not clear, but it is considered as the following action.

First, a hydroxyl group contained in lignin is reacted with a terminal carboxyl group or hydroxyl group of the polylactic acid resin or a glucose ring hydroxyl group of the cellulose resin to form a crosslinked structure. Here, the aromatic condensed phosphoric acid ester is dispersed in a free volume of a crosslinked structure, and the aromatic ring contained in the lignin has high affinity for the aromatic phosphoric acid ester, and therefore, a substantially uniform dispersion state is obtained, as compared with a case where an aromatic phosphoric acid ester is simply mixed and melt-kneaded with a polylactic acid resin or cellulose resin.

As a result, it is considered that the aromatic condensed phosphoric acid ester is contained in a good dispersibility state in the resin molded article by the above action of the lignin that has been added in the above range of amount, and as a result, it acts as a lubricant reducing the friction between other components.

Furthermore, it is considered that a resin composition formed by adding lignin to the polylactic acid resin or cellulose resin and the aromatic condensed phosphoric acid ester tends to be higher entanglement of the molecular chains of the resin in the resin molded article due to the crosslinked structure.

That is, it is considered that since the resin molded article obtained from the resin composition according to the present exemplary embodiment is a resin molded article having high entanglement of the molecular chains of the resin and contains a lubricant inside the entangled molecular chain, and thus, the friction between the components is reduced across the entire resin molded article.

As described above, the resin composition according to the present exemplary embodiment is a resin composition from which a resin molded article having improved flexibility is obtained.

Moreover, in the resin composition according to the present exemplary embodiment, since the polylactic acid resin or cellulose resin and the lignin are crosslinked, a configuration where a crosslinked polymer compound of the polylactic acid resin or cellulose resin and 0.07 phr to 8 phr of lignin, and 4 phr to 30 phr of an aromatic condensed phosphoric acid ester may be allowed, in addition to the above-described configurations.

Hereinbelow, the resin composition and the resin molded article according to the present exemplary embodiment and will be described in detail.

The resin composition according to the present exemplary embodiment includes a polylactic acid resin or cellulose resin and lignin, and an aromatic condensed phosphoric acid ester, as described above.

Incidentally, the resin composition according to the present exemplary embodiment may include other components within a range not interfering with the effects.

Cellulose Resin

The cellulose resin denotes a cellulose resin derived from a natural material, or a resin having a cellulose skeleton obtained by introducing a functional group biologically or chemically using the cellulose resin as a raw material.

As the raw material, use may be made of not only a natural cellulose resin such as cotton linter and wood pulp (hardwood pulp, softwood pulp), but also a cellulose resin having a low degree of polymerization (degree of polymerization of from 100 to 300) which is obtained through the acid hydrolysis of wood pulp, such as a microcrystalline cellulose resin, and these may be used in mixture. As the cellulose resin to be a raw material, the celluloses described in, for example, "Plastic Material Lecture (17), Cellulosic Resin" (written by Marusawa, Uda, published by Nikkan Kogyo Shinbun-sha, 1970); Japan Institute for Promoting Invention & Innovation's Journal of technical disclosure 2001-001745 (pp. 7 to 8); and "Encyclopedia of Cellulose (p. 523)" (edited by the Society of Cellulose of Japan, published by Asakura Shoten, 2000) are used, but the present invention should not be limited thereto.

Specific examples of the cellulose resin include unsubstituted cellulose, hemicellulose, substituted cellulose (for example, cellulose substituted with an acetyl group, an n-propoxyl group, an iso-propoxyl group, an n-butoxyl group, an iso-butoxyl groups, and a tert-butoxyl group), and more specifically, cellulose acetate, cellulose nitrate, cellulose acetate butyrate, cellulose propionate, and cellulose acetate propionate.

These may be used singly or in combination of two or more kinds thereof.

Among these, the cellulose resin is more preferably cellulose acetate, cellulose propionate, or cellulose acetate propionate, from the viewpoint of improvement of the flexibility of the obtained resin molded article.

Polylactic Acid Resin

The polylactic acid resin is not particularly limited as long as it has at least a carboxyl group at a terminal of a polymer chain (that is, the terminal of a main chain). It may be either an L-form or a D-form, or a mixture thereof (for example, a stereo-complex formed by mixing a poly-L lactic acid resin and a poly-D lactic acid resin, and a polylactic acid resin including both of an L-lactic acid resin block and a D-lactic acid resin block in the structure).

Examples of the polylactic acid resin include a resin having a structural unit represented by the following structural formula (3). Further, as the terminal of the polymer chain (the terminal of a main chain), a carboxyl group may be at both of the terminals, or a carboxyl group may be on one of the terminals and a different group (for example, a hydroxyl group) may be on the other terminal. However, it is more preferable that both the terminals be carboxyl groups.

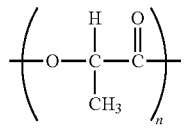

Structural formula (3)

As the polylactic acid resin, any of those having any molecular weight may be used. However, as the molecular weight gets smaller, the crosslinking gets stronger, and thus, the flexibility of the obtained resin molded article tends to get lowered. On the other hand, as the molecular weight gets larger, the crosslinking effect becomes insufficient, and thus, the flexibility of the obtained resin molded article tends to get lowered similarly. Accordingly, the weight-average molecular weight is preferably from 50,000 to 150,000, and more preferably from 60,000 to 120,000.

Furthermore, the weight-average molecular weight is measured by means of gel permeation chromatography (GPO). The measurement of the molecular weight by means of GPO is carried out using HLC-8320 CPC manufactured by Tosoh Corporation as a measurement device, columns TSKgel GMHHR-M+TSKgel GMHHR-M (7.8 mm I.D. 30 cm) manufactured by Tosoh Corporation, and chloroform as a solvent. The weight-average molecular weight is calculated using a molecular weight calibration curve prepared by a monodisperse polystyrene standard sample from the measurement results.

The content of the polylactic acid resin or cellulose resin may be from 72% by weight to 95% by weight, preferably from 83% by weight to 95% by weight, and more preferably from 83% by weight to 91% by weight, based on the total resin composition.

Lignin

Lignin is a polymer having a crosslinked structure, occupying about 25% of trees and shrubs, which has an irregular and complex chemical structure of a polyphenol, and has a skeleton having a hydroxyphenylpropane as a basic unit and many phenolic hydroxyl groups.

The raw material of lignin is not particularly limited as long as it contains lignin, and examples thereof include broad-leaved trees such as beech, needle-leaved trees such as cedar, pine, and cypress, rice hull, straw, acacia, willow, poplar, corn, bamboo, eucalyptus, rice straw, bagasse, sugar cane, and Erianthus.

Examples of a method for separating and extracting lignin from the trees and shrubs include a kraft method, a sulfuric acid method, and a water vapor blasting method.

Here, the water vapor blasting method refers to a method in which the trees and shrubs as raw materials are crushed by hydrolysis and pressure by the water vapor at a high temperature and a high pressure, lignin is dissolved in an organic solvent, and the lignin is separated and extracted from cellulose components and the hemicellulose components using water only.

From the viewpoint of improvement of the flexibility of the obtained resin molded article, the weight-average molecular weight of lignin is preferably from 5000 to 10000, and more preferably from 5000 to 7000.

If lignin has a large molecular weight, it has fewer reaction points in the resin composition, and thus, the flexibility of the obtained resin molded article may not be obtained in some cases. On the other hand, if lignin has a small molecular weight, it has more reaction points, the obtained resin molded article may be hard and brittle in some cases.

The weight-average molecular weight is measured by means of gel permeation chromatography (GPC). The measurement of the molecular weight by means of CPC is carried out using HLC-8320 GPC manufactured by Tosoh Corporation as a measurement device, columns TSKgel GMHHR-M+TSKgel GMHHR-M (7.8=I.D. 30 cm) manufactured by Tosoh Corporation, and chloroform as a solvent. The weight-average molecular weight is calculated using a molecular weight calibration curve prepared by a monodisperse polystyrene standard sample from the measurement results.

The content of the lignin is preferably from 0.07 phr to 8 phr, more preferably from 0.1 phr to 5 phr, and even more preferably from 0.2 phr to 5 phr, from the viewpoint of the improvement of the flexibility of the obtained resin molded article.

Aromatic Condensed Phosphoric Acid Ester

Examples of the aromatic condensed phosphoric acid ester include aromatic condensed phosphoric acid esters such as those in a bisphenol A type, a biphenylene type, and an isophthal type, and specifically an aromatic condensed phosphoric acid ester represented by the following formula (I) or (II).

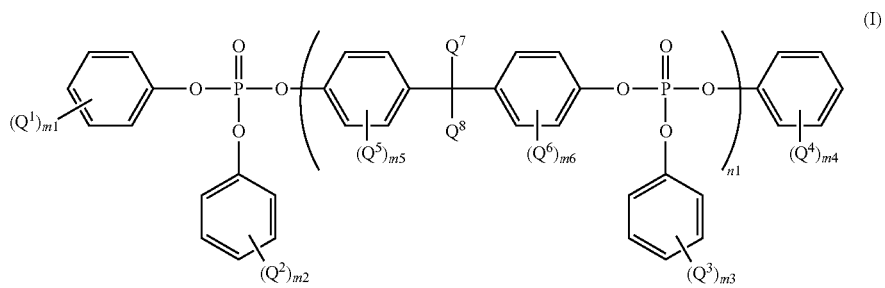
(I)

In the formula (I), $Q^1$, $Q^2$, $Q^3$ and $Q^4$ each independently represent an alkyl group having 1 to 6 carbon atoms, $Q^5$ and $Q^6$ each independently represent a methyl group, $Q^7$ and $Q^8$ each independently represent a hydrogen atom or a methyl group, m1, m2, m3 and m4 each independently represent an integer of 0 to 3, m5 and m6 each independently represent an integer of 0 to 2, and n1 represents an integer of 0 to 10.

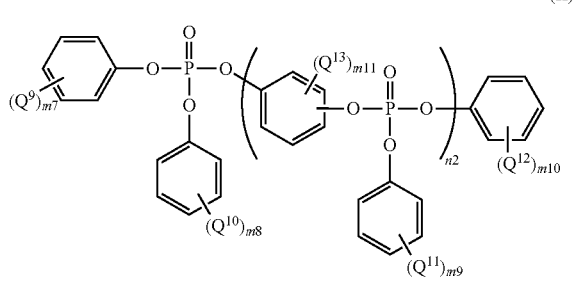
(II)

In the formula (II), $Q^9$, $Q^{10}$, $Q^{11}$, and $Q^{12}$ each independently represent an alkyl group having 1 to 6 carbon atoms, $Q^{13}$ represents a methyl group, m7, m8, m9 and m10 each independently represent an integer of 0 to 3, m11 represents an integer of 0 to 4, and n2 represents an integer of 0 to 10.

The condensed phosphoric acid ester may be a synthesized product or a commercially available product. Specific examples of the commercially available product of the condensed phosphoric acid ester include commercially available products manufactured by Daihachi Chemical Industry Co., Ltd. ("PX200", "PX201", "PX202", "CR741", and the like), and commercially available products manufactured by Adeka Corporation ("Adeka Stubs FP2100", "FP2200", and the like).

Among these, the condensed phosphoric acid ester is, from the viewpoint of the improvement of the flexibility of the obtained resin molded article, at least one selected from a compound represented by the following structural formula (1) (for example, "PX200" manufactured by Daihachi Chemical Industry Co., Ltd.) and a compound represented by the following structural formula (2) (for example, "CR741" manufactured by Daihachi Chemical Industry Co., Ltd.).

Structural formula (1)

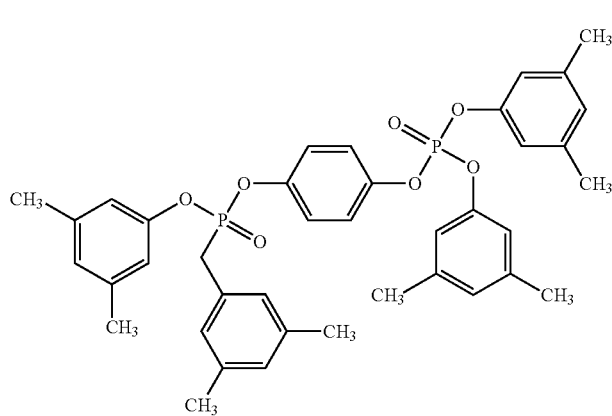

Structural formula (2)

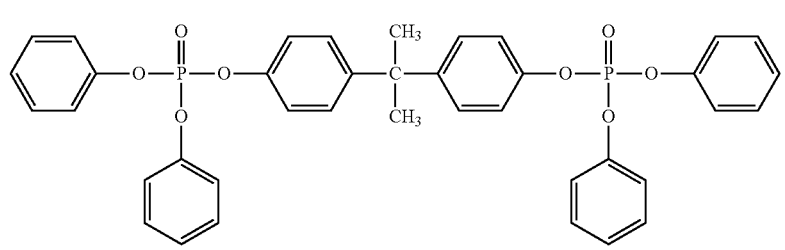

The content of the aromatic condensed phosphoric acid ester is preferably from 4 phr to 30 phr, more preferably from 5 phr to 20 phr, more preferably from 10 phr to 20 phr, and even more preferably from 15 phr to 20 phr, from the viewpoint of the improvement of the flexibility of the obtained resin molded article.

Particularly, by setting the content of the aromatic condensed phosphoric acid ester to from 10 phr to 20 phr, a resin molded article with flame retardancy accomplished while maintaining flexibility is obtained more easily.

Other Components

Examples of other components included in the resin composition according to the present exemplary embodiment include resins other than a polylactic acid resin or cellulose resin, and additives.

Specific examples of the resin other than a polylactic acid resin or cellulose resin include poly-3-hydroxybutyrate, polyhydroxyhexanate, polyhydroxyvalyrate, and copolymers thereof, polybutylene succinate, polybutylene adipate, polyethylene succinate, polyethylene adipate, and copolymers of two or more kinds selected therefrom.

Furthermore, other examples of the resin other than a polylactic acid resin or cellulose resin include thermoplastic resins known in the prior art, including polycarbonate resins, polypropylene resins, polyamide resins, aromatic polyester resins, polyolefin resins, polyester carbonate resins, polyphenylene ether resins, polyphenylene sulfide resins, polysulfone resins, polyethersulfone resins, polyarylene resins, polyetherimide resins, polyacetal resins, polyvinylacetal resins, polyketone resins, polyether ketone resins, polyether ether ketone resins, polyaryl ketone resins, polyethernitrile resins, liquid crystal resins, polybenzimidazole resins, polyparabanic acid resins, and specifically vinyl-based polymer or copolymer resins obtained by the polymerization or copolymerization of one or more vinyl monomers selected from an aromatic alkenyl compound, a methacrylic acid ester, an acrylic acid ester, and a vinyl cyanide compound; diene-aromatic alkenyl compound copolymer resins, vinyl cyanide-diene-aromatic alkenyl compound copolymer resins, aromatic alkenyl compound-diene-vinyl cyanide-N-phenylmaleimide copolymer resins, vinyl cyanide-(ethylene-diene-propylene (EPDM))-aromatic alkenyl compound copolymer resins, polyolefins, vinyl chloride resins, and chlorinated vinyl chloride resins.

These resins may be used singly or in combination of two or more kinds thereof.

Furthermore, the content of the resin other than a polylactic acid resin or cellulose resin is preferably 15% by weight or less, based on the total amount of the resin included in the resin composition.

Examples of the additive include an antioxidant, a reinforcing agent, a compatibilizing agent, a weathering agent, and an anti-hydrolyzing agent.

The content of each of the additives is preferably 5% by weight or less, based on the total amount of the resin composition.

Furthermore, a crosslinking catalyst may be added for crosslinking polymerization of the polylactic acid resin or cellulose resin with lignin.

Examples of the crosslinking catalyst include tetrabutoxytitanium acid, germanium oxide, tin octylate, and aluminum oxide.

The addition amount of the crosslinking catalyst is preferably from 0.01% by weight to 1% by weight, and more preferably from 0.05% by weight to 0.5% by weight, based on the total amount of the polylactic acid resin or cellulose resin and the lignin.

Method for Preparing Resin Composition

The resin composition according to the present exemplary embodiment is prepared by melt-kneading a mixture of the respective components.

Incidentally, as a unit for mixing or melt-kneading, known units are used, and examples thereof include a biaxial extruder, a Henschel mixer, a Banbury mixer, a single-screw extruder, a multi-screw extruder, and a co-kneader.

Resin Molded Article

The resin molded article according to the present exemplary embodiment is obtained by molding the resin composition according to the present exemplary embodiment. That is, the resin molded article according to the present exemplary embodiment includes a crosslinked polymer compound formed from a polylactic acid resin or cellulose resin and 0.07 phr to 8 phr of lignin, and an aromatic condensed phosphoric acid ester.

Specifically, the resin molded article according to the present exemplary embodiment may be obtained by, for example, molding the resin composition according to the present exemplary embodiment with a molding machine. Further, examples of the molding method using a molding machine include injection molding, extrusion molding, blow molding, hot press molding, calendar molding, coating molding, cast molding, dipping molding, vacuum molding, and transfer molding.

Here, the injection molding may be carried out by using, for example, a commercially available device such as NEX150 manufactured by Nissei Plastic Industrial Co., Ltd., NEX70000 manufactured by Nissei Plastic Industrial Co., Ltd., and SE50D manufactured by Toshiba Machine Co., Ltd.

Here, the cylinder temperature is preferably from 170° C. to 240° C., and more preferably from 180° C. to 210° C. Further, the mold temperature is preferably from 40° C. to 110° C.

The resin molded article according to the present exemplary embodiment is preferably used in the applications such as electrical and electronic equipment, home appliances, containers, and automobile interior materials. More specifically, it may be used in cases for household appliances, electrical and electronic equipment, or the like, various parts or the like, wrapping films, storage cases for CD-ROM, DVD, or the like, dinnerware, food trays, beverage bottles, or wrap materials for chemicals, and among these, the resin molded article according to the present exemplary embodiment is suitable for parts of electrical and electronic equipment. A majority of parts of the electrical and electronic equipment have complex shapes and are heavy products, and thus, require mechanical strength. However, according to the resin molded article according to the present exemplary embodiment, such required characteristics are fully satisfied.

EXAMPLES

Hereinbelow, the present invention will be described in detail referring to Examples, but the present invention is not limited to such Examples. Here, the "part (s)" and "%" are based on weight unless otherwise specified.

Preparation of Lignin

Lignin 1

Lignin 1 is prepared as follows.

As a raw material for lignin, bamboo is used. A bamboo material cut to an appropriate size is placed in a water vapor explosive device, and water vapor at 3.5 MPa is press-fitted therein and held for 4 minutes. Thereafter, the pressure is returned back to normal pressure at once to obtain a blasting treatment product. The obtained blasting treatment product is put into a dilute hydrochloric acid at a concentration of 2 mol/l and stirred for 1 hour. Then, water-soluble components are removed by washing the blasting treatment product after stirring with water until the pH of the washing solution reached 6 or higher. Thereafter, the residual water is removed with a vacuum-drying machine and the fiber materials are removed with an 80-mesh sieve to obtain Lignin 1. The weight average molecular weight of Lignin 1 is 8700.

Lignin 2

Lignin 2 is prepared as follows.

As a raw material for lignin, bamboo is used. A bamboo material cut to an appropriate size is put in a water vapor explosive device, and water vapor at 3.5 MPa is press-fitted therein and held for 4 minutes. Thereafter, the pressure is returned back to normal pressure at once to obtain a blasting treatment product. The obtained blasting treatment product is put into a dilute hydrochloric acid at a concentration of 2 mol/l and stirred for 1 hour. Then, the water-soluble components are removed by washing the blasting treatment product after stirring with water until the pH of the washing solution reached 6 or higher. Thereafter, the residual water is removed with a vacuum-drying machine. To 100 g of the dried product thus obtained is added 500 ml of acetone as an extraction solvent, followed by stirring for 10 minutes, and then filtering using a filter paper with a particle-retention diameter of 1 μm to remove the fiber materials. The extraction solvent is removed from the obtained filtrate to obtain Lignin 2. The weight average molecular weight of Lignin 2 is 6400.

Preparation of Lignophenol Derivative

Lignophenol Derivative 1

Separation Step

The scrap inscription of Cypress lumber is sieved with a 20-mesh sieve and 10 parts of the chips that have passed through the sieve is immersed in acetone for 20 hours, then vacuum-dried at 80° C. for 8 hours, and degreased. To the chips after degreasing is added 50 parts of p-cresol, followed by stirring at room temperature (26° C.) for 4 hours, adding 50 parts of 78% concentrated sulfuric acid, and stirring the mixture at 30° C. for 60 minutes. Thereafter, 1000 parts of distilled water are added to the mixture, followed by stirring. p-Cresol in the upper layer is separated and collected by decantation, and it is added dropwise to 1000 parts of diethyl ether that have been stirred, and the obtained precipitate is collected by centrifugation.

Water-Washing Step

Subsequently, the collected precipitate is washed with water.

Specifically, 10 parts of the collected precipitate are put and dispersed in 300 parts of distilled water that have been stirred, and then the distilled water is removed by centrifugation to collect the precipitate. This water-washing step is repeated 6 times to collect the precipitate.

Reprecipitation Step

Subsequently, 10 parts of the precipitate after water-washing are dissolved in 200 parts of acetone and the insoluble components are filtered through a filter paper with a particle-retention diameter of 1 μm. The residue is added dropwise to 1000 parts of a diethyl ether layer that have been stirred and reprecipitated. These steps of dissolution, filtration, and reprecipitation are repeated three times to obtain a lignophenol derivative 1.

Examples 1 to 17 and Comparative Examples 1 to 10

Preparation of Resin Composition

The materials are mixed at the compositional ratios shown in Tables 1 and 2 (the numeric values in the Tables are in parts by weight), kneaded at a cylinder temperature with a kneading temperature of 190° C. using a biaxial extruder (TEM3000 manufactured by Toshiba Machine Co., Ltd.), cooled, and pelletized to obtain pellets of the resin compositions 1 to 17 and the comparative resin compositions 1 to 10.

Preparation of Resin Molded Article

The pellets of the resin compositions obtained above are injection-molded at the cylinder temperatures (° C.) and the mold temperatures (° C.), each shown in Tables 1 and 2, using an injection molding machine (NEX150 manufactured by Nissei Plastic Industrial Co., Ltd.) to obtain specimens (thickness of a test piece: 4 mm and width of a test piece: 10 mm), molded by providing gates on both sides in the length direction, ISO multi-purpose dumbbell specimens (length of a test piece: 100 mm, width of a test piece: 10 mm, and thickness of a test piece: 4 mm), and UL specimens (length of a test piece: 125 mm, width of a test piece: 13 mm, and thickness of a test piece: 2.0 mm).

Evaluation

Evaluations are carried out for the each of the obtained specimens. The results are shown in Tables 1 and 2.

Evaluation of Flexibility (Tensile Strength and Nominal Tensile Strain)

The tensile strength (maximum stress) and the nominal tensile strain (deformation at break) are measured to evaluate the flexibility according to ISO527, with an evaluation device (Autograph AG-IS 5 kN manufactured by Shimadzu Corporation), using the specimens molded by providing gates on both sides in the length direction.

Evaluation of Flame Retardancy

A V test is carried out using a. UL specimen by a UL-94 method. Further, as evaluation criteria, starting from the highest flame retardancy, V–0, V–1, and V–2 are rated, and a case of the rating being below V–2, that is, a case of the specimen being fired is denoted as notV.

TABLE 1

| | | Product name (name of manufacturer) | Example 1 Composition 1 | Example 2 Composition 2 | Example 3 Composition 3 | Example 4 Composition 4 | Example 5 Composition 5 | Example 6 Composition 6 | Example 7 Composition 7 | Example 8 Composition 8 | Example 9 Composition 9 |
|---|---|---|---|---|---|---|---|---|---|---|---|
| Composition | Resin | Polylactic acid | 100 | 100 | 100 | 100 | 100 | 100 | 100 | 100 | 100 |
| | | Cellulose TE-2000 (Unitika) CAP-482-20 (Eastman Chemical Company) | — | — | — | — | — | — | — | — | — |
| | Lignin | Lignin 1 | 0.1 | 0.1 | 0.1 | 0.2 | 0.2 | 0.2 | 5 | 5 | 5 |
| | | Lignin 2 | — | — | — | — | — | — | — | — | — |
| | Phosphorous-containing compound | Aromatic condensed phosphoric acid ester PX-200 (Daihachi Chemical Industry Co., Ltd.) | 5 | 10 | 20 | 5 | 10 | 20 | 5 | 10 | 20 |
| | | Aromatic condensed phosphoric acid ester CR741 (Daihachi Chemical Industry Co., Ltd.) | — | — | — | — | — | — | — | — | — |
| | | Ammonium polyphosphate AP422 (Clariant) | — | — | — | — | — | — | — | — | — |
| | Others | Lignophenol derivative 1 | — | — | — | — | — | — | — | — | — |
| Molding conditions | | Cylinder temperature (° C.) | 185 | 185 | 185 | 185 | 185 | 185 | 185 | 185 | 185 |
| | | Mold temperature (° C.) | 40 | 40 | 40 | 40 | 40 | 40 | 40 | 40 | 40 |
| Evaluation results | | Flame retardancy | notV | V-1 | V-0 | notV | V-1 | V-0 | notV | V-1 | V-0 |
| | | Tensile strength (maximum stress) [MPa] | 58 | 56 | 55 | 61 | 62 | 58 | 56 | 53 | 52 |
| | | Nominal tensile strain (deformation at break)[%] | 18.1 | 38.1 | 52.7 | 20 | 41.2 | 53.9 | 52.7 | 24.1 | 32.8 |

TABLE 1-continued

| | | | | Example 10 composition 10 | Example 11 composition 11 | Example 12 composition 12 | Example 13 composition 13 | Example 14 composition 14 | Example 15 composition 15 | Example 16 composition 16 | Example 17 composition 17 |
|---|---|---|---|---|---|---|---|---|---|---|---|
| | | | Product name (name of manufacturer) | | | | | | | | |
| Composition | Resin | Polylactic acid | TE-2000 (Unitika) | 100 | 100 | 100 | 100 | 100 | — | — | — |
| | | Cellulose | CAP-482-20 (Eastman Chemical Company) | — | — | — | — | — | 100 | 100 | 100 |
| | Lignin | Lignin 1 | | 0.2 | 0.2 | — | — | — | 0.1 | 0.1 | — |
| | | Lignin 2 | | — | — | 0.1 | 0.2 | 0.2 | — | — | 5 |
| | Phosphorous-containing compound | Aromatic condensed phosphoric acid ester | PX-200 (Daihachi Chemical industry Co., Ltd.) | — | — | 20 | 10 | 20 | 10 | 20 | 20 |
| | | Aromatic condensed phosphoric acid ester | CR741 (Daihachi Chemical Industry Co., Ltd.) | 10 | 20 | — | — | — | — | — | — |
| | | Ammonium polyphosphate | AP422 (Clariant) | — | — | — | — | — | — | — | — |
| | Others | Lignophenol derivative 1 | | — | — | — | — | — | — | — | — |
| Molding conditions | | Cylinder temperature (° C.) | | 185 | 185 | 185 | 185 | 185 | 210 | 210 | 210 |
| | | Mold temperature (° C.) | | 40 | 40 | 40 | 40 | 40 | 50 | 50 | 50 |
| Evaluation results | | Flame retardancy | | V-1 | V-0 | V-0 | V-1 | V-0 | V-1 | V-1 | V-1 |
| | Flexibility | Tensile strength (maximum stress) [MPa] | | 58 | 55 | 56 | 58 | 53 | 47 | 45 | 41 |
| | | Nominal tensile strain (deformation at break)[%] | | 43.3 | 52.1 | 47.6 | 41.2 | 51.3 | 38.3 | 42.7 | 34.1 |

TABLE 2

| | | Product name (name of manufacturer) | Comparative Example 1 Comparative composition 1 | Comparative Example 2 Comparative composition 2 | Comparative Example 3 Comparative composition 3 | Comparative Example 4 Comparative composition 4 | Comparative Example 5 Comparative composition 5 | Comparative Example 6 Comparative composition 6 | Comparative Example 7 Comparative composition 7 | Comparative Example 8 Comparative composition 8 | Comparative Example 9 Comparative composition 9 | Comparative Example 10 Comparative composition 10 |
|---|---|---|---|---|---|---|---|---|---|---|---|---|
| Composition | Resin | Polylactic acid | TE-2000 (Unitika) | 100 | 100 | 100 | 100 | 100 | 100 | 100 | 100 | — | — |
| | | Cellulose | CAP-482-20 (Eastman Chemical Company) | — | — | — | — | — | — | — | — | 100 | 100 |
| | Lignin | Lignin 1 | | 1 | — | 0.05 | 10 | 5 | 5 | 1 | — | 1 | — |
| | | Lignin 2 | | — | — | — | — | — | — | — | — | — | 10 |
| | Phosphorous-containing compound | Aromatic condensed phosphoric acid ester | PX-200 (Daihachi Chemical Industry Co., Ltd.) | — | 10 | 10 | 10 | 3 | 40 | — | 20 | — | — |
| | | Aromatic condensed phosphoric acid ester | CR741 (Daihachi Chemical Industry Co., Ltd.) | — | — | — | — | — | — | — | — | — | — |
| | | Ammonium polyphosphate | AP422 (Clariant) | — | — | — | — | — | — | 10 | — | — | — |
| | Others | Lignophenol derivative 1 | | — | — | — | — | — | — | — | 0.2 | — | — |
| Molding conditions | | Cylinder temperature (° C.) | | 185 | 185 | 185 | 185 | 185 | 185 | 185 | 185 | 210 | 210 |
| | | Mold temperature (° C.) | | 40 | 40 | 40 | 40 | 40 | 40 | 40 | 40 | 50 | 50 |
| Evaluation results | | Flame retardancy | | notV | V-2 | V-2 | V-1 | notV | V-0 | notV | V-0 | notV | notV |
| | Flexibility | Tensile strength (maximum stress) [MPa] | | 72 | 54 | 54 | 60 | 60 | 41 | 61 | 52 | 56 | 32 |
| | | Nominal tensile strain (deformation at break)[%] | | 2.8 | 4.2 | 7.1 | 8.3 | 5.5 | 22.1 | 2.4 | 44.2 | 4.3 | 5.2 |

From the above results, it can be seen that good results are obtained with respect to the flexibility in the present Examples. Specifically, it can be seen that the results on the nominal tensile strain are excellent in Examples 1 to 17, as compared with Comparative Examples 1, 2, 9, and 10, in which lignin or the aromatic condensed phosphoric acid ester is not contained.

When Examples 2, 5, 8, and 13 are compared with Comparative Examples 3 and 4, having the same contents of the polylactic acid resin and the aromatic condensed phosphoric acid ester (PX-200) and different types of lignin (lignin 1 or 2) or contents thereof, it can be seen that the results on the nominal tensile strain are excellent in Examples 2, 5, 8, and 13, in which the content of lignin (lignin 1 or 2) is from 0.07 phr to 8 phr, as compared with Comparative Examples 3 and 4, in which the content of lignin (lignin 1 or 2) is not from 0.07 phr to 8 phr.

When Examples 7 to 9 are compared with Comparative Examples 5 and 6, having the same contents of the polylactic acid resin and lignin 1 and different contents of the aromatic condensed phosphoric acid ester (PX-200), it can be seen that the results on the nominal tensile strain are excellent in Examples 7 to 9, in which the aromatic condensed phosphoric acid ester is from 4 phr to 30 phr, as compared with Comparative Examples 5 and 6, in which the content of the aromatic condensed phosphoric acid ester is not from 4 phr to 30 phr.

When Examples 2, 5, 8, 10, 13, and 15, in which the aromatic condensed phosphoric acid ester is contained as a phosphorous-containing compound are compared with Comparative Example 7, in which ammonium polyphosphate is contained as a phosphorous-containing compound, it can be seen that the results on the nominal tensile strain are excellent, irrespective of the content of lignin, in Examples 2, 5, 8, 10, 13, and 15, in which aromatic condensed phosphoric acid ester is contained as a phosphorous-containing compound, as compared with Comparative Example 7, in which ammonium polyphosphate is contained as a phosphorous-containing compound.

When Examples 6 and 14, having the same contents of the polylactic acid resin and the aromatic condensed phosphoric acid ester (PX-200) and in which lignin (lignin 1 or 2) is contained, are compared with Comparative Example 8, in which a lignophenol derivative 1 is contained, it can be seen that the results on the nominal tensile strain are excellent in Examples 6 and 14 in which lignin (lignin 1 or 2) is contained, as compared with Comparative Example 8 in which a lignophenol derivative 1 is contained In addition, when Examples 2 and 3 are compared with Example 1; Examples 5 and 6 are compared with Example 4; and Examples 8 and 9 are compared with Example 7, each having the same contents of the polylactic acid resin and lignin 1 and different contents of the aromatic condensed phosphoric acid ester (PX-200), it can be seen that the results on the flame retardancy are excellent while maintaining the tensile strength in Examples 2 and 3, Examples 5 and 6, and Examples 8 and 9, in which the content of the aromatic condensed phosphoric acid ester is from 10 phr to 20 phr, as compared with Examples 1, 4, and 7 in which the content of the aromatic condensed phosphoric acid ester is not from 10 phr to 20 phr.

The foregoing description of the exemplary embodiments of the present invention has been provided for the purposes of illustration and description. It is not intended to be exhaustive or to limit the invention to the precise forms disclosed. Obviously, many modifications and variations will be apparent to practitioners skilled in the art. The embodiments were chosen and described in order to best explain the principles of the invention and its practical applications, thereby enabling others skilled in the art to understand the invention for various embodiments and with the various modifications as are suited to the particular use contemplated. It is intended that the scope of the invention be defined by the following claims and their equivalents.

What is claimed is:

1. A resin composition comprising:
   a polylactic acid resin or cellulose resin,
   0.07 phr to 8 phr of lignin, and
   4 phr to 30 phr of an aromatic condensed phosphoric acid ester,
   wherein a weight-average molecular weight of the lignin is in a range of from 5000 to 10000.

2. The resin composition according to claim 1, wherein a weight ratio of the lignin to the aromatic condensed phosphoric acid ester is in a range of from 1:1 to 1:200.

3. The resin composition according to claim 1, wherein an amount of the aromatic condensed phosphoric acid ester is from 5 phr to 20 phr.

4. The resin composition according to claim 1, wherein an amount of lignin is from 0.1 phr to 5 phr.

5. The resin composition according to claim 1, wherein a content of the polylactic acid resin or cellulose resin is in a range of from 72% by weight to 95% by weight, based on the total resin composition.

6. A resin composition comprising:
   a crosslinked polymer compound formed from a polylactic acid resin or cellulose resin and 0.07 phr to 8 phr of lignin, and
   4 phr to 30 phr of an aromatic condensed phosphoric acid ester.

7. The resin composition according to claim 6, wherein an amount of lignin is from 0.1 phr to 5 phr.

8. The resin composition according to claim 6, wherein a weight ratio of the lignin to the aromatic condensed phosphoric acid ester is in a range of from 1:1 to 1:200.

9. The resin composition according to claim 6, wherein an amount of the aromatic condensed phosphoric acid ester is from 5 phr to 20 phr.

10. The resin composition according to claim 6, wherein a weight-average molecular weight of the lignin is in a range of from 5000 to 10000.

11. The resin composition according to claim 6, wherein a content of the polylactic acid resin or cellulose resin is in a range of from 72% by weight to 95% by weight, based on the total resin composition.

12. A resin molded article comprising:
    a crosslinked polymer compound formed from a polylactic acid resin or cellulose resin and 0.07 phr to 8 phr of lignin, and
    4 phr to 30 phr of an aromatic condensed phosphoric acid ester.

13. The resin molded article according to claim 12, wherein an amount of lignin is from 0.1 phr to 5 phr.

14. The resin molded article according to claim 12, wherein a weight ratio of the lignin to the aromatic condensed phosphoric acid ester is in a range of from 1:1 to 1:200.

15. The resin molded article according to claim 12, wherein an amount of the aromatic condensed phosphoric acid ester is from 5 phr to 20 phr.

16. The resin molded article according to claim 12, wherein a weight-average molecular weight of the lignin is in a range of from 5000 to 10000.

* * * * *